United States Patent
Jia et al.

(10) Patent No.: US 11,901,579 B2
(45) Date of Patent: Feb. 13, 2024

(54) POLYMER BATTERY SEPARATOR WITH INTERPENETRATING NETWORK STRUCTURE AND PREPARATION METHOD THEREOF

(71) Applicant: JIANGSU HORIZON NEW ENERGY TECH CO., LTD., Changzhou (CN)

(72) Inventors: Peiliang Jia, Changzhou (CN); Mengxi Zhao, Changzhou (CN); Xingxing Weng, Changzhou (CN); Zhaohui Chen, Changzhou (CN)

(73) Assignee: JIANGSU HORIZON NEW ENERGY TECH CO., LTD., Changzhou (CN)

( * ) Notice: Subject to any disclaimer, the term of this patent is extended or adjusted under 35 U.S.C. 154(b) by 528 days.

(21) Appl. No.: 17/272,264

(22) PCT Filed: Aug. 3, 2020

(86) PCT No.: PCT/CN2020/106587
§ 371 (c)(1),
(2) Date: Feb. 26, 2021

(87) PCT Pub. No.: WO2021/042928
PCT Pub. Date: Mar. 11, 2021

(65) Prior Publication Data
US 2021/0399382 A1    Dec. 23, 2021

(30) Foreign Application Priority Data
Sep. 5, 2019   (CN) .................. 201910835151.1

(51) Int. Cl.
*H01M 50/426* (2021.01)
*H01M 50/403* (2021.01)

(52) U.S. Cl.
CPC ....... *H01M 50/426* (2021.01); *H01M 50/403* (2021.01)

(58) Field of Classification Search
None
See application file for complete search history.

(56) References Cited

FOREIGN PATENT DOCUMENTS

| CN | 103146018 A | 6/2013 |
|----|-------------|--------|
| CN | 105047843 A | 11/2015 |
| CN | 108263056 A | 7/2018 |

(Continued)

*Primary Examiner* — Carlos Barcena
(74) *Attorney, Agent, or Firm* — Bayramoglu Law Offices LLC

(57) ABSTRACT

A polymer battery separator with an interpenetrating network structure and a preparation method thereof are disclosed. A multilayer microporous separator includes a PVDF layer, and a PE-PVDF porous substrate located on a surface of the PVDF layer. Finger-like through holes with a pore size of 100-150 nm are distributed in the PVDF finger-like pore layer. An interpenetrating network structure with a pore size of 50-100 nm is distributed on an interface between the PVDF finger-like pore layer and the PE microporous layer. Micropores with a pore size of 20-50 nm are distributed in the PE microporous layer. The surface of the PVDF layer is covered with the PE-PVDF porous substrate, so that the multilayer microporous separator forms an interpenetrating network structure, which has improved thermal stability and high-temperature resistance.

10 Claims, 1 Drawing Sheet

(56) References Cited

FOREIGN PATENT DOCUMENTS

| | | |
|---|---|---|
| CN | 109256515 A | 1/2019 |
| CN | 109461871 A | 3/2019 |
| CN | 110518178 A | 11/2019 |
| JP | 2010073366 A | 4/2010 |

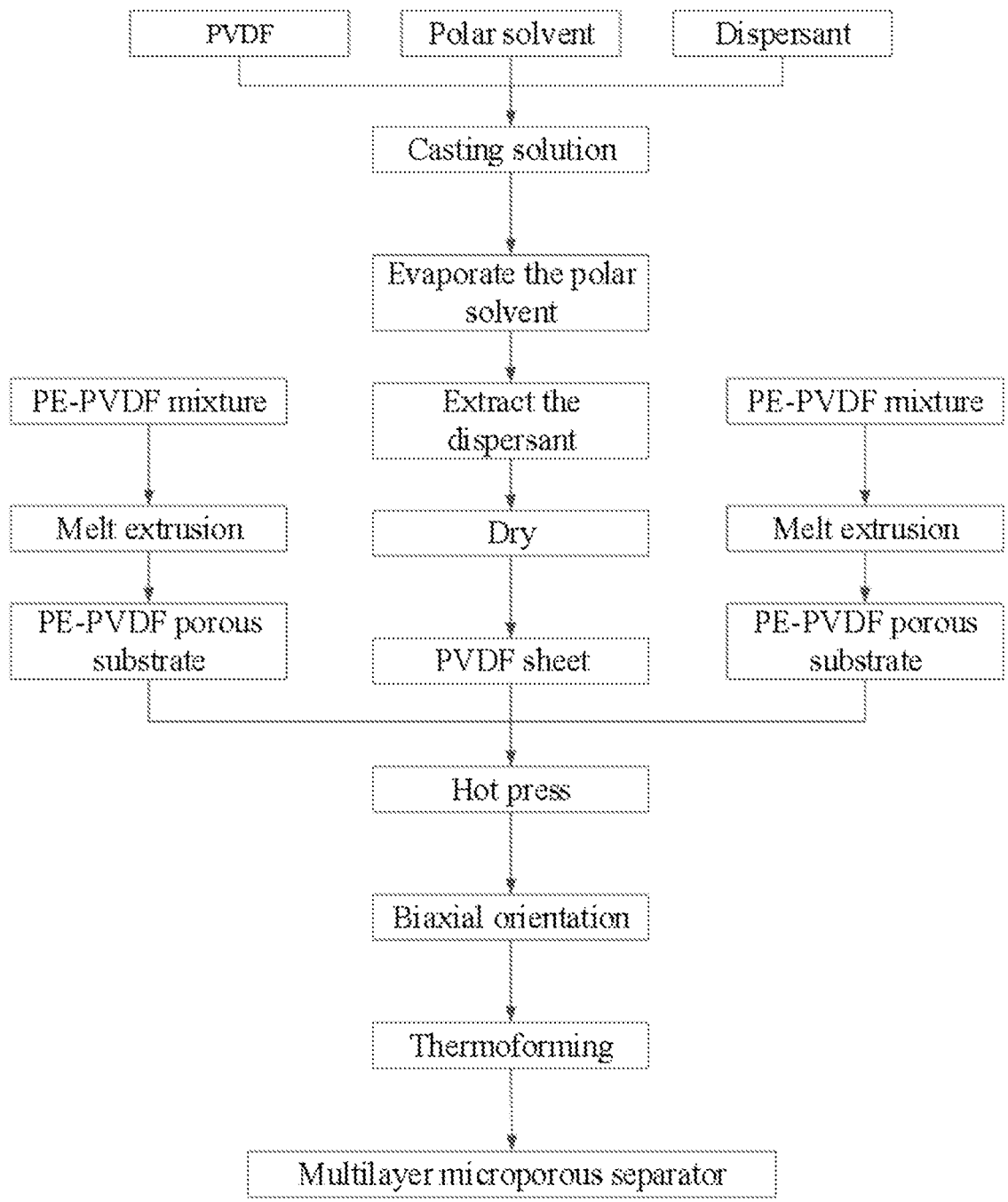

POLYMER BATTERY SEPARATOR WITH INTERPENETRATING NETWORK STRUCTURE AND PREPARATION METHOD THEREOF

CROSS REFERENCE TO THE RELATED APPLICATIONS

This application is the national phase entry of International Application No. PCT/CN2020/106587, filed on Aug. 3, 2020, which is based upon and claims priority to Chinese Patent Application No. 201910835151.1, filed on Sep. 5, 2019, the entire contents of which are incorporated herein by reference.

TECHNICAL FIELD

The present invention relates to the technical field of lithium battery separators, and in particular relates to a polymer battery separator with an interpenetrating network structure and a preparation method thereof.

BACKGROUND

In recent years, due to excellent properties, lithium-ion batteries have attracted the attention of governments and researchers at home and abroad, and the investment in the research and development of various components of lithium-ion batteries is also increasing. As a key component of the lithium-ion batteries, separators play an important role in safety performance, electric capacity, and circulatory effect of the batteries.

At present, the existing lithium-ion battery separator is generally prepared from polyethylene, polypropylene, and other organic polymer materials. As a result of a relatively single separator component, the following defects occur in the separator with respect to some properties. The dimensional stability of the separator is poor at a high temperature, which readily causes deformation of the separator and leads to battery short circuit. A pure polyethylene separator has a single aperture structure, which cannot meet relatively high ion permeability and cannot achieve the safety by preventing the passage of an electrode material. The adhesion between the electrode material and the separator is low, and the electrode material is prone to being separated from the separator under the external impact, which reduces the battery efficiency.

SUMMARY

An object of the present invention is to provide a polymer battery separator with an interpenetrating network structure and a preparation method thereof.

In order to solve the above problems, the present invention provides a multilayer microporous separator, including a polyvinylidene fluoride (PVDF) layer, and a polyethylene (PE)-PVDF porous substrate located on a surface of the PVDF layer. The PE-PVDF porous substrate includes a PVDF finger-like pore layer and a PE microporous layer that are successively stacked on the surface of the PVDF layer. Finger-like through holes with a pore size of 100-150 nm are distributed in the PVDF finger-like pore layer. An interpenetrating network structure with a pore size of 50-100 nm is distributed on an interface between the PVDF finger-like pore layer and the PE microporous layer. Micropores with a pore size of 20-50 nm are distributed in the PE microporous layer.

Further, the PE-PVDF porous substrate is suitable for being prepared by melt extrusion of a PE-PVDF mixture. An extrusion temperature is 150-160° C., and the PE-PVDF mixture includes a composite of polyethylene/polyvinylidene fluoride.

Further, the polyethylene includes at least one of high-density polyethylene, linear polyethylene, low-density polyethylene, and a small amount of ultrahigh molecular weight polyethylene; wherein the ultrahigh molecular weight polyethylene is less than 10% by weight and has a molecular weight ranging from 1,000,000 to 5,000,000.

Further, the polyvinylidene fluoride includes a vinylidene fluoride-hexafluoropropylene copolymer with a molecular weight ranging from 100,000 to 500,000.

Further, the PVDF layer is derived from a PVDF precursor and prepared by thermally induced phase transformation. The PVDF precursor, in parts by weight, includes: 4-10 parts of PVDF; 0-12 parts of a dispersant; and 40-100 parts of a polar solvent.

Further, the dispersant includes polyvinylpyrrolidone, with a molecular weight ranging from 1,000,000 to 2,000,000.

Further, the polar solvent includes at least one selected from the group consisting of dimethyl sulfoxide, N-methylpyrrolidone, and dimethylacetamide.

In another aspect, the present invention further provides a preparation method of a multilayer microporous separator, including: preparing a PE-PVDF porous substrate; preparing a PVDF sheet; hot-pressing the PE-PVDF porous substrate on a surface of the PVDF sheet; carrying out a biaxial orientation; and performing a thermoforming to obtain the multilayer microporous separator.

Further, a method of preparing the PE-PVDF porous substrate includes: adding a PE-PVDF mixture to a twin-screw extruder, and extruding it after full melting and mixing to form a PE-PVDF cast sheet.

Further, a method of preparing the PVDF sheet includes: dissolving PVDF in a polar solvent, heating and stirring the resulting solution to make the PVDF fully dissolved to form a uniform casting solution; adding a dispersant to the casting solution and continuously stirring the resulting solution by ultrasonic for 1-2 hours to make the dispersant occupy a larger hole position in the PVDF; pouring the casting solution onto a horizontal glass plate and heating the casting solution to completely evaporate the polar solvent to form the PVDF sheet; immersing the PVDF sheet in ethanol for extraction, and fully dissolving the dispersant therein in the ethanol; and drying to obtain the PVDF sheet.

Further, a method of hot-pressing the PE-PVDF porous substrate on the surface of the PVDF sheet includes: laminating two PE-PVDF porous substrates on two surfaces of the PVDF sheet respectively; and cross-linking and bonding the PE-PVDF porous substrates and a PVDF layer at a high temperature by high-temperature hot pressing, so as to form a PVDF homogeneous structure on an interface between the PE-PVDF porous substrates and the PVDF layer.

The present invention has the following advantages: the surface of the PVDF layer is covered with the PE-PVDF porous substrate, so that the multilayer microporous separator of the present invention forms an interpenetrating network structure, which has the advantages of good thermal stability and high-temperature resistance. In addition, PVDF may also act as an adhesive, which can enhance the adhesion between an electrode and the multilayer microporous separator and improve the stability of the batteries.

Other features and advantages of the present invention will be described in the following specification, and become apparent in part from the following specification, or be learned from the practice of the present invention. The objectives and other advantages of the present invention are achieved and obtained in the structures specified in the specification, claims, and accompanying drawings.

In order to make the above objectives, features, and advantages of the present invention more obvious and understandable, preferred embodiments are given below and described in detail with reference to the accompanying drawings.

BRIEF DESCRIPTION OF THE DRAWINGS

In order to more clearly illustrate the specific embodiments of the present invention or the technical solutions in the prior art, the accompanying drawings used in the description of the specific embodiments or the prior art will be briefly introduced below. It is apparent that, the accompanying drawings in the following description are only some embodiments of the present invention, and other drawings can be obtained by those of ordinary skill in the art from the provided drawings without creative efforts.

FIGURE is a flow chart showing a preparation process of a multilayer microporous separator according to the present invention.

DETAILED DESCRIPTION OF THE EMBODIMENTS

In order to make the objectives, technical solutions, and advantages of the embodiments of the present invention clearer, the technical solutions of the present invention are described clearly and completely below with reference to the accompanying drawings. It is apparent that the embodiments described herein are a part of rather than all of the embodiments of the present invention. All other embodiments obtained by those of ordinary skill in the art based on the embodiments in the present invention without creative efforts fall within the protection scope of the present invention.

In order to better understand the technical solutions of the present application, the terms or abbreviations in the present application are defined or explained at first:

PVDF: polyvinylidene fluoride; and
PE: polyethylene.

Embodiment 1

A multilayer microporous separator according to Embodiment 1 includes: a PVDF layer, and a PE-PVDF porous substrate located on a surface of the PVDF layer.

As an optional implementation of the PE-PVDF porous substrate, the PE-PVDF porous substrate includes a PVDF finger-like pore layer and a PE microporous layer that are successively stacked on the surface of the PVDF layer. Finger-like through holes with a pore size of 100-150 nm are distributed in the PVDF finger-like pore layer. An interpenetrating network structure with a pore size of 50-100 nm is distributed on an interface between the PVDF finger-like pore layer and the PE microporous layer. Micropores with a pore size of 20-50 nm are distributed in the PE microporous layer.

The interpenetrating network structure includes a finger-like through hole with a relatively large size, which can improve the capacity of electrolyte and the transport efficiency of lithium ions. The micropore in the PE microporous layer has a relatively small pore size, which can effectively prevent a short circuit phenomenon caused by the passage of the electrode material through the separator, so that the multilayer microporous separator has higher safety performance. The interpenetrating network structure with a pore size between the finger-like through hole and the micropore can closely connect the PE microporous layer to the PVDF finger-like pore layer, which improves the stability of the multilayer microporous separator. In addition, an aperture size (also called a pore size) of the interpenetrating network structure is 50-100 nm, which is between pore sizes of the finger-like pore and the micropore, and therefore can guide the transport of lithium ions in the separator, and ensure high ion transport performance as well as improve the safety of the batteries.

Optionally, the PE-PVDF porous substrate is suitable for being prepared by melt extrusion of a PE-PVDF mixture, and an extrusion temperature is 150-160° C. The extrusion temperature is optionally 153° C. or 156° C.

Optionally, the PE-PVDF mixture includes, but is not limited to, a composite of polyethylene/polyvinylidene fluoride. The polyethylene includes: at least one of high-density polyethylene (HDPE), linear low-density polyethylene (LLDPE), low-density polyethylene (LDPE), and a small amount of ultrahigh molecular weight polyethylene (UHMWPE). Molecular weights of the HDPE, the LLDPE, and the LDPE range from 100,000 to 1,000,000. The UHMWPE is less than 10% by weight and has a molecular weight ranging from 1,000,000 to 5,000,000, which can effectively improve processing and mechanical properties of the separator.

Optionally, the polyvinylidene fluoride includes, but is not limited to, a vinylidene fluoride-hexafluoropropylene copolymer (PVDF-HEP) with a molecular weight ranging from 100,000 to 500,000, which is conducive to improving the processability of polymer composite, reaching good high-temperature resistance and mechanical properties, and ensuring good dimensional stability of the separator.

As an optional implementation of the PVDF layer, the PVDF layer is derived from a PVDF precursor and prepared by thermally induced phase transformation.

Optionally, the PVDF precursor, in parts by weight, includes: 4-10 parts of PVDF; 0-12 parts of a dispersant; and 40-100 parts of a polar solvent. The dispersant includes polyvinylpyrrolidone, with a molecular weight ranging from 1,000,000 to 2,000,000. The polar solvent includes at least one selected from the group consisting of dimethyl sulfoxide, N-methylpyrrolidone, and dimethylacetamide. The polar solvent is analytically pure and needs to be distilled before use.

Optionally, the thermally induced phase transformation includes: first using the polar solvent to dissolve PVDF and the dispersant into a mixed casting solution, and then improving mixing uniformity and dispersion of the casting solution by mechanical agitation and ultrasonic treatment. The type and proportion of the polar solvent can affect the size and shape of the finger-like pore, and a specific proportion should be formulated according to an actual situation.

Embodiment 2

FIGURE shows a flow chart of a preparation process of a multilayer microporous separator according to the present invention. Referring to FIGURE, on the basis of Embodiment 1, Embodiment 2 further provides a preparation method of a multilayer microporous separator, including: preparing a PE-PVDF porous substrate; preparing a PVDF sheet; hot-pressing the PE-PVDF porous substrate on a surface of the PVDF sheet; carrying out a biaxial orientation; and performing a thermoforming to obtain the multilayer microporous separator. After the biaxial orientation and the thermoforming, the pore size of the micropores in the PE microporous layer is between 20 nm and 50 nm. Finger-like through holes with a pore size of 100 nm to 150 nm are evenly distributed on a surface of the PVDF finger-like pore layer. Pores of the interpenetrating network structure where the micropores and the finger-like through holes intersect are distributed on an interface between the PVDF finger-like pore layer and the PE microporous layer, with a pore size between the pore sizes of the micropores and the finger-like pores.

The structure and specific implementation process of the multilayer microporous separator can be obtained by referring to the related description in Embodiment 1, and are not repeated herein.

Optionally, a method of preparing the PE-PVDF porous substrate includes: adding a PE-PVDF mixture to a twin-screw extruder, and extruding it after full melting and mixing to form a PE-PVDF cast sheet, that is, the PE-PVDF porous substrate. In general, a thickness of the cast sheet is kept at about 50 µm at a particular extrusion temperature and a particular extrusion rate.

Optionally, a method of preparing the PVDF sheet includes: dissolving PVDF in a polar solvent, heating and stirring the resulting solution to make the PVDF fully dissolved to form a uniform casting solution; adding a dispersant to the casting solution and continuously stirring the resulting solution by ultrasonic for 1-2 hours to make the dispersant occupy a larger hole position in the PVDF; pouring the casting solution onto a horizontal glass plate and heating the casting solution at 120° C. to completely evaporate the polar solvent to form the PVDF sheet with a thickness of about 50 µm; immersing the PVDF sheet in ethanol for extraction, and fully dissolving the dispersant therein in the ethanol; and drying at 70° C. to obtain the PVDF sheet.

Optionally, a method of hot-pressing the PE-PVDF porous substrate on the surface of the PVDF sheet includes: laminating two PE-PVDF porous substrates on two surfaces of the PVDF sheet respectively; and cross-linking and bonding the PE-PVDF porous substrates and a PVDF layer at a high temperature by high-temperature hot pressing at 160° C., so as to form a PVDF homogeneous structure on an interface of the PE-PVDF porous substrates and the PVDF layer.

Optionally, a draw ratio of the biaxial orientation is 5-10, and is optionally 6 or 8.

Embodiment 3

(1) Preparation of a PE-PVDF Porous Substrate

A predetermined amount of a mixture of linear polyethylene and a vinylidene fluoride-hexafluoropropylene copolymer is added to a twin screw extruder. After sufficient melting and mixing, a cast sheet with a thickness of about 50 µm, that is, the PE-PVDF porous substrate, is prepared at an extrusion temperature of 160° C.

(2) Preparation of a PVDF Sheet

First, 100 g of PVDF is dissolved in 400 g of a polar solvent, and the resulting solution is heated and stirred to make the PVDF fully dissolved into a uniform casting solution. Then, 50 g of a dispersant is added thereto and the resulting solution is continuously stirred by ultrasonic for 1 to 2 hours to make the dispersant occupy a larger hole position in the PVDF. The casting solution is poured on a horizontal glass plate, and the polar solvent is completely evaporated by heating at 120° C. to form the PVDF sheet with a thickness of about 50 µm. Then the sheet is immersed in ethanol for extraction, so that the dispersant in the separator is fully dissolved in the ethanol. Then the sheet after the extraction is dried at a temperature of about 70° C.

(3) Hot Pressing

Two PE-PVDF porous substrates prepared in (1) are laminated on two surfaces of the PVDF sheet prepared in (2) respectively. Then, the PE-PVDF porous substrates and the PVDF sheet are cross-linked and bonded at a high temperature by high-temperature hot pressing at a temperature of 160° C., and a PVDF homogeneous structure is formed on an interface of the PE-PVDF porous substrates and the PVDF sheet.

(4) Molding

After the hot pressing, biaxial orientation is carried out with a draw ratio of 5, and then thermoforming is carried out.

Embodiment 4

(1) Preparation of a PE-PVDF porous substrate

A predetermined amount of a mixture of linear polyethylene and a vinylidene fluoride-hexafluoropropylene copolymer is added to a twin screw extruder. After sufficient melting and mixing, a cast sheet with a thickness of about 50 µm, that is, the PE-PVDF porous substrate, is prepared at an extrusion temperature of 150° C.

(2) Preparation of a PVDF sheet

First, 40 g of PVDF is dissolved in 1000 g of a polar solvent, and the resulting solution is heated and stirred to make the PVDF fully dissolved into a uniform casting solution. Then, 120 g of a dispersant is added thereto and the resulting solution is continuously stirred by ultrasonic for 1 to 2 hours to make the dispersant occupy a larger hole position in the PVDF. The casting solution is poured on a horizontal glass plate, and the polar solvent is completely evaporated by heating at 120° C. to form the PVDF sheet with a thickness of about 50 µm. Then the sheet is immersed in ethanol for extraction, so that the dispersant in the separator is fully dissolved in the ethanol. Then the sheet after the extraction is dried at a temperature of about 70° C.

(3) Hot Pressing

Two PE-PVDF porous substrates prepared in (1) are laminated on two surfaces of the PVDF sheet prepared in (2) respectively. Then, the PE-PVDF porous substrates and the PVDF sheet are cross-linked and bonded at a high temperature by high-temperature hot pressing at a temperature of 160° C., and a PVDF homogeneous structure is formed on an interface of the PE-PVDF porous substrates and the PVDF sheet.

(4) Molding

After the hot pressing, biaxial orientation is carried out with a draw ratio of 10, and then thermoforming is carried out.

Embodiment 5

(1) Preparation of a PE-PVDF Porous Substrate

A predetermined amount of a mixture of linear polyethylene and a vinylidene fluoride-hexafluoropropylene copolymer is added to a twin screw extruder. After sufficient melting and mixing, a cast sheet with a thickness of about 50 µm, that is, the PE-PVDF porous substrate, is prepared at an extrusion temperature of 155° C.

(2) Preparation of a PVDF Sheet

First, 70 g of PVDF is dissolved in 800 g of a polar solvent, and the resulting solution is heated and stirred to make the PVDF fully dissolved into a uniform casting solution. Then, 20 g of a dispersant is added thereto and the resulting solution is continuously stirred by ultrasonic for 1 to 2 hours to make the dispersant occupy a larger hole position in the PVDF. The casting solution is poured on a horizontal glass plate, and the polar solvent is completely evaporated by heating at 120° C. to form the PVDF sheet with a thickness of about 50 μm. Then the sheet is immersed in ethanol for extraction, so that the dispersant in the separator is fully dissolved in the ethanol. Then the sheet after the extraction is dried at a temperature of about 70° C.

(3) Hot Pressing

Two PE-PVDF porous substrates prepared in (1) are laminated on two surfaces of the PVDF sheet prepared in (2) respectively. Then, the PE-PVDF porous substrates and the PVDF sheet are cross-linked and bonded at a high temperature by high-temperature hot pressing at a temperature of 160° C., and a PVDF homogeneous structure is formed on an interface of the PE-PVDF porous substrates and the PVDF sheet.

(4) Molding

After the hot pressing, biaxial orientation is carried out with a draw ratio of 8, and then thermoforming is carried out.

Embodiment 6

(1) Preparation of a PE-PVDF Porous Substrate

A predetermined amount of a mixture of linear polyethylene and a vinylidene fluoride-hexafluoropropylene copolymer is added to a twin screw extruder. After sufficient melting and mixing, a cast sheet with a thickness of about 50 μm, that is, the PE-PVDF porous substrate, is prepared at an extrusion temperature of 158° C.

(2) Preparation of a PVDF Sheet

First, 50 g of PVDF is dissolved in 600 g of a polar solvent, and the resulting solution is heated and stirred to make the PVDF fully dissolved into a uniform casting solution. Then, 100 g of a dispersant is added thereto and the resulting solution is continuously stirred by ultrasonic for 1 to 2 hours to make the dispersant occupy a larger hole position in the PVDF. The casting solution is poured on a horizontal glass plate, and the polar solvent is completely evaporated by heating at 120° C. to form the PVDF sheet with a thickness of about 50 μm. Then the sheet is immersed in ethanol for extraction, so that the dispersant in the separator is fully dissolved in the ethanol. Then the sheet after the extraction is dried at a temperature of about 70° C.

(3) Hot pressing

Two PE-PVDF porous substrates prepared in (1) are laminated on two surfaces of the PVDF sheet prepared in (2) respectively. Then, the PE-PVDF porous substrates and the PVDF sheet are cross-linked and bonded at a high temperature by high-temperature hot pressing at a temperature of 160° C., and a PVDF homogeneous structure is formed on an interface of the PE-PVDF porous substrates and the PVDF sheet.

(4) Molding

After the hot pressing, biaxial orientation is carried out with a draw ratio of 7, and then thermoforming is carried out.

Based on the above, in the multilayer microporous separator (i.e., a polymer battery separator with an interpenetrating network structure) and the preparation method thereof, a composite of polyethylene/polyvinylidene fluoride is used as a porous substrate, a PE-PVDF porous substrate is prepared by melt extrusion, and a PVDF sheet is prepared by solvent induced phase transformation. Then, the two are laminated for hot pressing, biaxial orientation and thermoforming, to finally form a multilayer microporous separator with an interpenetrating network structure that has a good thermal stability and high-temperature resistance. The interpenetrating network structure includes a finger-like through hole with a relatively large size, which can improve the capacity of electrolyte and the transport efficiency of lithium ions. The micropore in the PE microporous layer has a relatively small pore size, which can effectively prevent a short circuit phenomenon caused by the passage of the electrode material through the separator, so that the multilayer microporous separator has higher safety performance. The interpenetrating network structure with a pore size between the finger-like through hole and the micropore can closely connect the PE microporous layer to the PVDF finger-like pore layer, which improves the stability of the multilayer microporous separator. In addition, since the PVDF itself has good high-temperature resistance and mechanical properties, it can also prevent battery internal short circuit at an abnormal high temperature. At the same time, PVDF may also act as an adhesive, which can enhance the adhesion between an electrode and the multilayer microporous separator and improve the stability of the batteries.

Inspired by the above ideal embodiments of the present invention, persons skilled in the art can make various changes and modifications without departing from the technical ideas of the present invention through the above description. The technical scope of the present invention is not limited to the contents of the specification but has to be determined according to the scope of the claims.

What is claimed is:

1. A multilayer microporous separator, comprising:
a PVDF layer, and a PE-PVDF porous substrate located on a surface of the PVDF layer;
wherein
the PE-PVDF porous substrate comprises a PVDF finger-like pore layer and a PE microporous layer, the PVDF finger-like pore layer and the PE microporous layer are successively stacked on the surface of the PVDF layer;
finger-like through holes with a pore size of 100-150 nm are distributed in the PVDF finger-like pore layer;
an interpenetrating network structure with a pore size of 50-100 nm is distributed on an interface between the PVDF finger-like pore layer and the PE microporous layer; and
micropores with a pore size of 20-50 nm are distributed in the PE microporous layer.

2. The multilayer microporous separator according to claim 1, wherein
the PE-PVDF porous substrate is prepared by melt extrusion of a PE-PVDF mixture, and an extrusion temperature is 150-160° C.; the PE-PVDF mixture comprises a composite of polyethylene and polyvinylidene fluoride.

3. The multilayer microporous separator according to claim 2, wherein
the polyethylene comprises at least one of high-density polyethylene, linear polyethylene, low-density polyethylene, and a predetermined amount of ultrahigh molecular weight polyethylene;
the ultrahigh molecular weight polyethylene is less than 10% by weight and has a molecular weight ranging from 1,000,000 to 5,000,000.

4. The multilayer microporous separator according to claim 3, wherein
the polyvinylidene fluoride comprises a vinylidene fluoride-hexafluoropropylene copolymer with a molecular weight ranging from 100,000 to 500,000.

5. The multilayer microporous separator according to claim 1, wherein
the PVDF layer is derived from a PVDF precursor and prepared by thermally induced phase transformation;
the PVDF precursor, in parts by weight, comprises:
4-10 parts of PVDF;
0-12 parts of a dispersant; and
40-100 parts of a polar solvent.

6. The multilayer microporous separator according to claim 5, wherein
the dispersant comprises polyvinylpyrrolidone, and a molecular weight of the dispersant ranges from 1,000,000 to 2,000,000.

7. The multilayer microporous separator according to claim 6, wherein
the polar solvent comprises at least one selected from the group consisting of dimethyl sulfoxide, N-methylpyrrolidone, and dimethylacetamide.

8. A preparation method of a multilayer microporous separator, comprising:
preparing a PE-PVDF porous substrate;
preparing a PVDF sheet;
hot pressing the PE-PVDF porous substrate on a surface of the PVDF sheet;
carrying out a biaxial orientation; and
performing a thermoforming to obtain the multilayer microporous separator.

9. The preparation method according to claim 8, wherein
a method of preparing the PE-PVDF porous substrate comprises:
adding a PE-PVDF mixture to a twin-screw extruder, and extruding PE-PVDF mixture after full melting and mixing to form a PE-PVDF cast sheet; and
a method of preparing the PVDF sheet comprises:
dissolving PVDF in a polar solvent to obtain a first resulting solution, heating and stirring the first resulting solution to make the PVDF fully dissolved to form a uniform casting solution;
adding a dispersant to the uniform casting solution to obtain a second resulting solution, and continuously stirring the second resulting solution by ultrasonic for 1-2 hours to make the dispersant occupy a larger hole position in the PVDF;
pouring the uniform casting solution onto a horizontal glass plate and heating the uniform casting solution to completely evaporate the polar solvent to form a crude PVDF sheet;
immersing the crude PVDF sheet in ethanol for an extraction, and fully dissolving the dispersant the crude PVDF sheet into the ethanol to obtain a processed PVDF sheet; and
drying the processed PVDF sheet to obtain the PVDF sheet.

10. The preparation method according to claim 9, wherein
a method of hot pressing the PE-PVDF porous substrate on the surface of the PVDF sheet comprises:
laminating the PE-PVDF porous substrate on each of two surfaces of the PVDF sheet respectively; and
cross-linking and bonding the PE-PVDF porous substrate and the PVDF sheet at a high temperature by high-temperature hot pressing, to form a PVDF homogeneous structure on an interface of the PE-PVDF porous substrates and the PVDF sheet.

\* \* \* \* \*